(12) United States Patent
Busch et al.

(10) Patent No.: US 7,480,736 B2
(45) Date of Patent: Jan. 20, 2009

(54) METHOD OF DISCOVERING AND OPERATING A PAYLOAD NODE

(75) Inventors: Richard C. Busch, Phoenix, AZ (US); Tommy O. Lewis, Salesville, OH (US); Bruce D. Rosenkrantz, Tempe, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 1195 days.

(21) Appl. No.: 10/822,360

(22) Filed: Apr. 12, 2004

(65) Prior Publication Data

US 2005/0226168 A1   Oct. 13, 2005

(51) Int. Cl.
*G06F 15/173* (2006.01)
(52) U.S. Cl. .................. 709/244; 709/223; 709/220
(58) Field of Classification Search ........... 709/223, 709/224, 244, 220, 238
See application file for complete search history.

(56) References Cited

U.S. PATENT DOCUMENTS

| | | | | |
|---|---|---|---|---|
| 5,710,885 A | * | 1/1998 | Bondi | 709/224 |
| 6,138,247 A | * | 10/2000 | McKay et al. | 714/10 |
| 6,490,617 B1 | * | 12/2002 | Hemphill et al. | 709/223 |
| 6,977,908 B2 | * | 12/2005 | de Azevedo et al. | 370/254 |
| 7,155,547 B2 | * | 12/2006 | Wolfe et al. | 710/104 |
| 7,340,247 B1 | * | 3/2008 | O'Hara et al. | 370/338 |
| 7,415,634 B2 | * | 8/2008 | Anderson et al. | 713/2 |
| 2002/0147974 A1 | * | 10/2002 | Wookey | 709/220 |
| 2003/0212772 A1 | * | 11/2003 | Harris | 709/220 |
| 2004/0003058 A1 | * | 1/2004 | Trossen | 709/220 |
| 2007/0223523 A1 | * | 9/2007 | Montpetit et al. | 370/252 |

* cited by examiner

*Primary Examiner*—Philip B Tran
(74) *Attorney, Agent, or Firm*—Harness, Dickey & Pierce, P.L.C.

(57) ABSTRACT

A method of discovering and operating a payload node (104) includes in a computer network (100) having a central node (102) coupled to a payload node slot (110), coupling the payload node to the payload node slot. The payload node executing a payload boot algorithm (120) located at the payload node. The payload boot algorithm discovers a hardware capability set (122) of the payload node. The payload boot algorithm communicating the hardware capability set to a payload discovery manager (114) at the central node. The payload discovery manager selecting a software set (116) based on the hardware capability set. The payload discovery manager communicating the software set to the payload node and the payload node transitioning from the payload boot algorithm to the software set while bypassing rebooting the payload node to the software set.

25 Claims, 2 Drawing Sheets

METHOD OF DISCOVERING AND OPERATING A PAYLOAD NODE

BACKGROUND OF THE INVENTION

In a prior art computer network, particularly a backplane-based computer network, when a new payload node is inserted into the chassis, the central node is unaware of hardware capabilities of the payload node beyond the existence of the payload node. Prior art computer system interfaces such as Universal Serial Bus (USB) or Peripheral Component Interconnect (PCI) are canned interfaces where a known type of device with known capabilities is plugged into the interface. Here the computer system already knows the hardware configuration and capabilities of the device ahead of time. In the prior art, there is no discovery of the hardware capabilities of the device, which has the disadvantage of preventing the computer system or computer network from optimizing itself using the capabilities of the plugged in payload node or device.

Accordingly, there is a significant need for an apparatus and method that overcomes the deficiencies of the prior art outlined above.

BRIEF DESCRIPTION OF THE DRAWINGS

Referring to the drawing.

Figure 1:
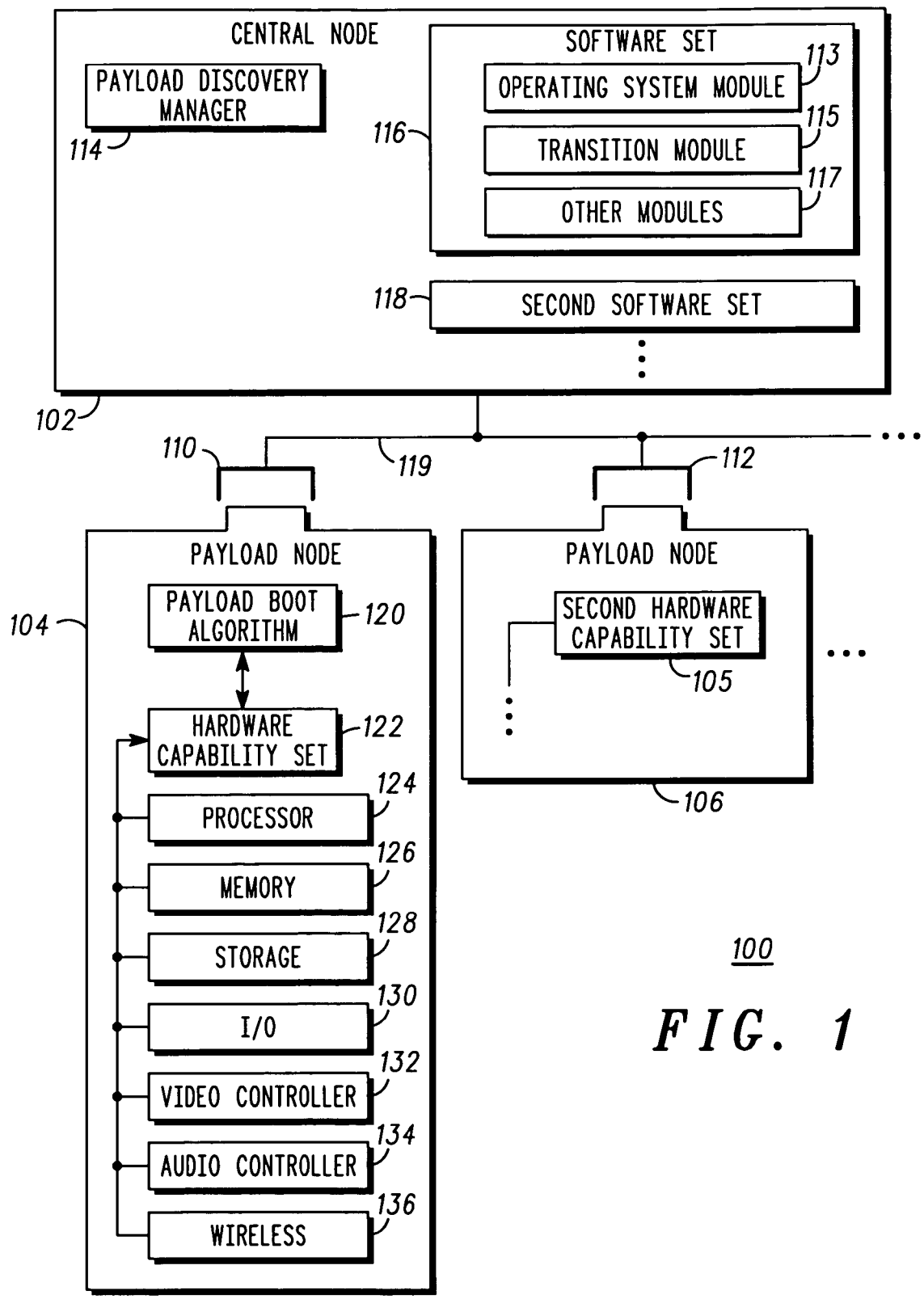
FIG. 1 depicts a block diagram of a computer network according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures, software blocks and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact. However, "coupled" may mean that two or more elements are not in direct contact with each other, but yet still co-operate or interact with each other.

FIG. 1 depicts a block diagram of a computer network 100 according to one embodiment of the invention. Computer network 100 can include a multi-service platform system chassis, with software and any number of payload node slots 110, 112 for inserting payload nodes 104, 106. In an embodiment, computer network 100 can be a backplane-based computer network, wherein a backplane 119 couples payload node slots 110, 112 and payload nodes 104, 106 to a central node 102. As an example of an embodiment, computer network 100 can include a multi-service platform system chassis having model MCIP805 manufactured by Motorola Computer Group, 2900 South Diablo Way, Tempe, Ariz. 85282. The invention is not limited to this model or manufacturer and any computer network 100 and multi-service platform system is included within the scope of the invention.

As shown in FIG. 1, computer network 100 can comprise a central node 102 coupled to any number of payload node slots 110, 112 via backplane 119. Backplane 119 can accommodate any combination of a packet switched backplanes including a distributed switched fabric or a multi-drop bus type backplane. Payload nodes 104, 106 can add functionality to computer network 100 when plugged into payload node slots 110, 112 through the addition of processors, memory, storage devices, I/O elements, and the like. In other words, payload nodes 104, 106 can include any combination of processors, memory, storage devices, I/O elements, and the like, to give computer network 100 any of a plurality of functionalities. In an embodiment shown in FIG. 1, two payload node slots 110, 112 and two payload nodes 104, 106 are shown. This is not limiting of the invention and any number of payload node slots and payload nodes are within the scope of the invention. For example, in one embodiment, computer network 100 can have 18 payload node slots to accommodate 18 payload nodes.

In an embodiment, computer network 100 can use any number of switch modules as a central node 102 with any number of payload nodes 104, 106 coupled to central node 102. Central node 102 can be, for example and without limitation, a server, one or more switch modules, and the like. Computer network 100 can be based on a point-to-point, switched input/output (I/O) fabric. Computer network 100 can include both node-to-node (for example computer systems that support I/O node add-in slots) and chassis-to-chassis environments (for example interconnecting computers, external storage systems, external Local Area Network (LAN) and Wide Area Network (WAN) access devices in a data-center environment). Computer network 100 can be implemented by using one or more of a plurality of switched fabric network standards, for example and without limitation, InfiniBand™, Serial RapidIO™, Ethernet™, and the like. Computer network 100 is not limited to the use of these switched fabric network standards and the use of any switched fabric network standard is within the scope of the invention.

In one embodiment, backplane 119 can be an embedded packet switched backplane as is known in the art. In another embodiment, backplane 119 can be an overlay packet switched backplane that is overlaid on top of a backplane that does not have packet switched capability. In an embodiment of the invention, central node 102 is coupled to payload node slots 110, 112 via backplane 119. In an embodiment, backplane 119 comprises plurality of links capable of transmitting signals to and from central node 102 and payload nodes 104, 106. As an example of an embodiment, each of plurality of links in backplane 119 can comprise two 100-ohm differential signaling pairs.

In an embodiment, backplane 119 can use the CompactPCI Serial Mesh Backplane (CSMB) standard as set forth in PCI Industrial Computer Manufacturers Group (PCIMG®) specification 2.20, promulgated by PCIMG, 301 Edgewater Place, Suite 220, Wakefield, Mass. CSMB provides infrastructure for applications such as Ethernet, Serial RapidIO, Ethernet, other proprietary or consortium based transport protocols, and the like. In another embodiment computer network 100 can use an Advanced Telecom and Computing Architecture (AdvancedTCA™) standard as set forth by PCIMG.

In another embodiment, computer network 100 can utilize, for example and without limitation, Common Switch Interface Specification (CSIX). CSIX defines electrical and packet control protocol layers for traffic management and communication. Packet traffic can be serialized over links suitable for a backplane environment. The CSIX packet protocol encapsulates any higher-level protocols allowing interoperability in an open architecture environment.

In yet another embodiment, backplane 119 can use VERSAmodule Eurocard (VMEbus) switched serial standard backplane (VXS) as set forth in VITA 41 promulgated by VMEbus International Trade Association (VITA), P.O. Box 19658, Fountain Hills, Ariz., 85269 (where ANSI stands for American National Standards Institute). VXS includes a packet switched network on a backplane coincident with the VMEbus parallel-type bus, where VMEbus is a parallel multi-drop bus network that is known in the art.

In an embodiment, payload node 104, 106 can be a VMEbus board having a VMEbus board form factor. VMEbus form factor, including mechanical dimensions, electrical specifications, and the like are known in the art and set forth in the ANSI/VITA 1-1994 and ANSI/VITA 1.1-1997 standards promulgated by the VMEbus International Trade Association (VITA), P.O. Box 19658, Fountain Hills, Ariz., 85269 (where ANSI stands for American National Standards Institute).

In still another embodiment, payload node 104, 106 can be a CompactPCI® board having a CompactPCI form factor. CompactPCI form factor, including mechanical dimensions, electrical specifications, and the like, are known in the art and set forth in the CompactPCI Specification, by PCI Industrial Computer Manufacturers Group (PCIMG™), 301 Edgewater Place, Suite 220, Wakefield, Mass.

In yet another embodiment, payload node 104, 106 can be an Advanced Telecommunications Computer Architecture (AdvancedTCA™) board having an AdvancedTCA form factor. AdvancedTCA form factor, including mechanical dimensions, electrical specifications, and the like, are known in the art and set forth in the AdvancedTCA Specification, by PCI Industrial Computer Manufacturers Group (PCIMG), 301 Edgewater Place, Suite 220, Wakefield, Mass.

In still yet another embodiment, payload node 104, 106 can be an Advanced Packaging System (APS) board having an APS form factor. APS form factor, including mechanical dimensions, electrical specifications, and the like, are known in the art and set forth in the ANSI/VITA Specification 34.

In an embodiment, payload node 104 can include a hardware capability set 122, which can include any hardware, associated software, and the capabilities of such hardware and software present on payload node 104. Hardware capability set 122, for example and without limitation, can include without limitation items and any derivative of their capabilities as listed below.

In an embodiment, payload node 104 can include a processor 124 for processing algorithms stored in memory 126. Memory 126 comprises control algorithms, and can include, but is not limited to, random access memory (RAM), read only memory (ROM), flash memory, electrically erasable programmable ROM (EEPROM), and the like. Memory 126 can contain stored instructions, tables, data, and the like, to be utilized by processor 124. Payload node 104 can also include storage 128, for example disk drives, optical drives, hard drives, and the like. In another embodiment, payload node 104 can include any number of input/output (I/O) ports, for example, T1, E1, USB, coaxial, and the like, or other communication ports. Payload node 104 can also include video controller 132, audio controller 134, and the like, to facilitate or augment video or audio functions within computer network 100. In yet another embodiment, payload node 104 can include wireless interface 136, which can include a wireless transceiver, antenna, software, and the like to allow payload node 104 and computer network 100 to communicate over a wireless network such as a LAN, WAN, and the like. Payload node 104 is not limited to the items described above, nor must payload node 104 include each of the items described above. Payload node 104 can include any type of functionality to be made available to computer network 100 and be within the scope of the invention.

Software blocks that perform embodiments of the invention are part of computer program modules comprising computer instructions, such as control algorithms, that are stored in a computer-readable medium such as memory described above.

In an embodiment, payload node 104 can include hardware capability set 122 that is on payload node 104 or added via a mezzanine card as known in the art. Mezzanine card can be coupled to payload node 104 to provide additional functionality. Although any type of mezzanine card is within the scope of the invention, an exemplary mezzanine card can be a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386. A particular example of an embodiment is a PCI mezzanine card (PMC) having a PMC form factor. PMC form factor, including mechanical dimensions, electrical specifications, and the like, are known in the art and also set forth in the Institute of Electrical and Electronics Engineers (IEEE) standard P1386.

In still another embodiment, mezzanine card can include a mini-PCI expansion card having a mini-PCI form factor. Mini-PCI cards and form factors are known in the art with mechanical, electrical and configuration standards set out in the Mini PCI Specification revision 1 or later and the PCI Local Bus Specification revision 2.3 or later as promulgated by the PCI Special Interest Group, 5300 N.E. Elam Young Parkway, Hillsboro, Oreg.

In an embodiment, payload node 104 can include a payload boot algorithm 120 stored in memory 126 and executable by processor 124. In an embodiment, upon coupling payload node 104 to payload node slot 110, payload boot algorithm 120 can execute independent of central node 102.

In an embodiment, payload boot algorithm 120 can discover hardware capability set 122 available on payload node 104 or coupled to payload node 104 via a mezzanine card. In an embodiment, payload boot algorithm 120 can be an operating system that executes utilities that discover and gather hardware capability set 122 on payload node 104. Payload boot algorithm 120 can be, for example and without limitation, a Linux based algorithm, Windows based algorithm, Java script, and the like. In effect, payload boot algorithm 120 searches payload node 104 and discovers hardware capability set 122, which includes not only the hardware available on payload node 104, but also the capabilities of that hardware (i.e. processor speed, memory capacity, storage capacity, I/O ports and their available throughput, and the like). This differs from prior art processes in that payload boot algorithm 120 runs on payload node 104 independent of any instructions or detection of central node 102. This also differs from the prior art in that payload boot algorithm 120 discovers the hardware and capabilities of payload node 104, whereas in the prior art the central node 102 would detect payload node 104 and attempt to discover just the hardware available on payload node 104 (e.g. just detect the presence of a processor) without discovering the capabilities of the hardware on payload node 104.

Computer network 100 can comprise any number of payload node slots 110, 112 and any number of payload nodes 104, 106. For example, computer network 100 can comprises payload node 106 having second hardware capability set 105, which can be the same or different from hardware capability set 122 on payload node 104.

In an embodiment, payload boot algorithm 120, once hardware capability set 122 is discovered, communicates hardware capability set 122 to payload discovery manager 114 at central node 102. Hardware capability set 122 can be communicated to central node 102 via backplane 119, wireless communication means, and the like.

In an embodiment, central node 102 comprises a plurality of software sets. For example, in FIG. 1, central node 102 comprises at least software set 116 and second software set 118. In another embodiment, central node 102 can comprises only one software set. Payload discovery manager 114 selects a software set based on the hardware capability set received from payload node 104, specifically received from payload boot algorithm 120 of payload node 104.

In an embodiment, payload discovery manager 114 can select which software set to apply to payload node 104 based on hardware capability set 122 and optimization of computer network 100. Optimizing computer network 100 can include without limitation, applying hardware capability set 122 of payload node 104 to minimize processing time of computer network 100, maximize processing speed of computer network, maximize efficiency of data storage, and the like. In another embodiment, payload discovery manager 114 can select which software set to apply to payload node 104 based on pre-configured or user-configured decision rules to validate payload node 104 is correct for computer network's 100 functionality and then select software set for the pre-configured or user-configured purposes of payload node 104. Decision rules can be in the form of an algorithm, look-up table, and the like. Once software set 116 is selected, payload discovery manager 114 can communicate software set 116 to payload node 104.

Software set 116 can comprise an operating system module 113, a transition module 115 and other modules 117 such as applications, services, file systems, and the like. In an embodiment, transition module 115 operates to transition payload node 104 from running payload boot algorithm 120 to running any of software set 116 while bypassing rebooting payload node 104 to any of software set 116.

In an embodiment, if software set 116 contains an operating system module 113, transition module 115 transitions payload node 104 from payload boot algorithm 120 to operating system module 113. As an example, if payload boot algorithm 120 is a Linux operating system and operating system module 113 is a Windows based operating system, then transition module 115 operates to transition payload node 104 from running payload boot algorithm 120 (the Linux operating system) to running the operating system module 113 (the Windows operating system) while bypassing rebooting the payload node 104 to the operating system module 113. In other words, transition module 115 is coupled to transition payload node 104 from payload boot algorithm 120 to operating system module 113 without payload node 104 having to reboot from a BIOS or firmware. This ensures a faster and more efficient transfer from payload boot algorithm 120 to operating system module 113 with minimal runtime interruption so payload node 104 is operational on computer network 100 quickly. In effect, payload discovery manager 114 selects transition module 115 as a part of software set 116 based on hardware capability set 122 and software set 116, including operating system module 113 selected. In another embodiment, other modules 117 are able to run using payload boot algorithm and software set does not include operating system module 113.

This unique methodology allows operating system module 113 to be, for example, a standard off-the-shelf operating system module that does not require customization in order to run on payload node 104, transition payload node or boot on payload node. Transition module 115 handles all transitioning from the payload boot algorithm 120 already running on payload node 104 to the operating system module 113. In this way, transitioning payload node 104 operates transparently to operating system module 113 and other modules 117 that download and execute on payload node 104. This has the advantage of simplifying the management of computer network 100 as operating system module 113 and other modules 117 can be standard off-the-shelf items that do not require customization to transition payload node 104.

The embodiments of the invention also have the advantage in that payload boot algorithm operates to discover hardware capability set 122 even if hardware capability set 122 has been modified. For example, payload node 104 can be removed from computer network and hardware capability set 122 modified to define a second hardware capability set 105 (e.g. installation of a faster processor, different I/O ports, and the like), and payload node 104 reinserted into payload node slot 110 to interface with computer network 100. Upon reinsertion, payload boot algorithm 120 operates to discover second hardware capability set 105 and communicate this to payload discovery manager 114. Payload discovery manager can then select software set 116 or second software set 118 based on second hardware capability set 105 and download to payload node 104 in a manner analogous to that described above. Transitioning can also occur in a manner analogous with that described above.

Figure 2:
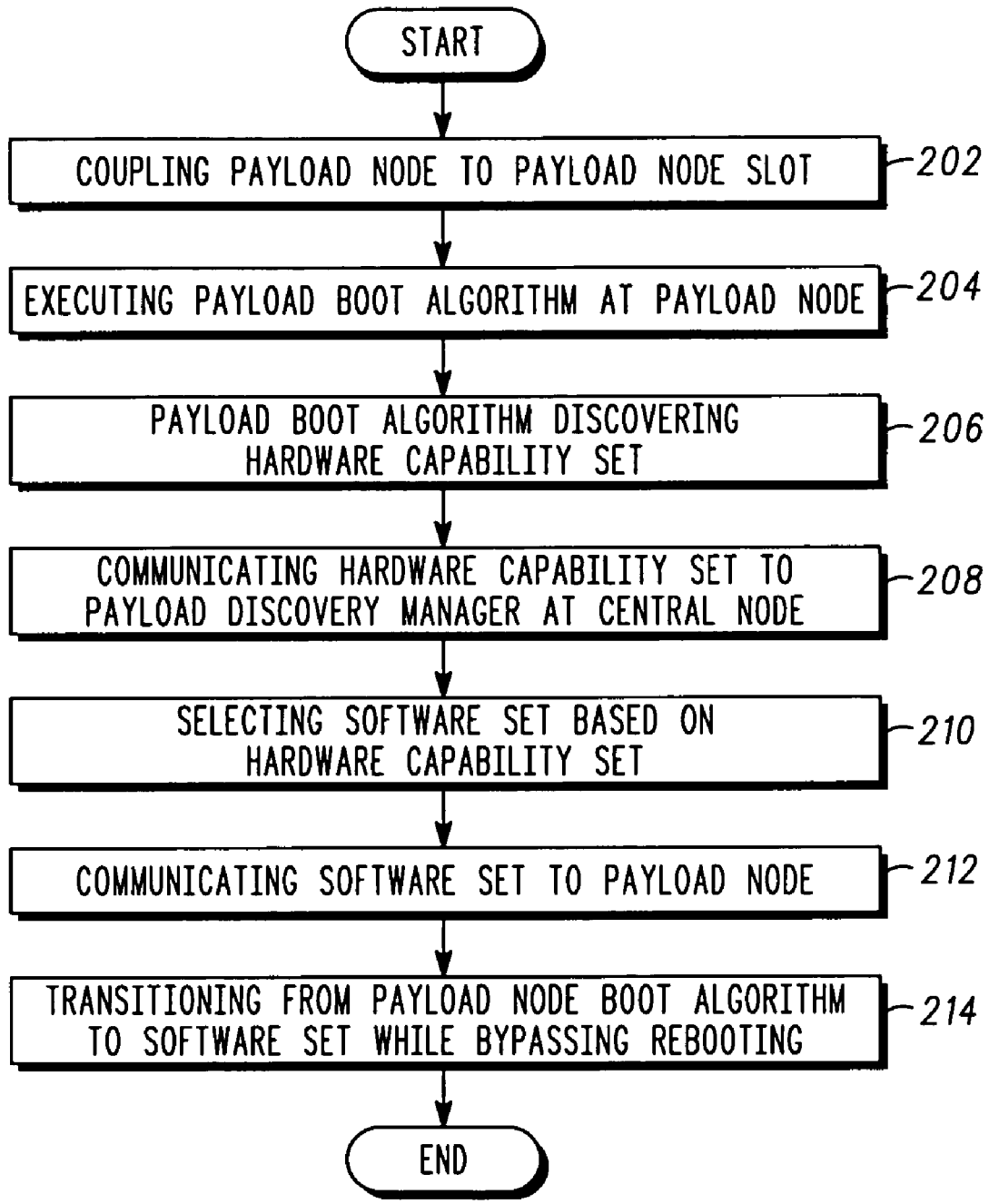
FIG. 2 illustrates a flow diagram of a method of the invention according to an embodiment of the invention.

FIG. 2 illustrates a flow diagram of a method of the invention according to an embodiment of the invention. In step 202, payload node 104 is coupled to payload node slot 110. In step 204, payload node 104 executes payload boot algorithm 120 independent of central node 102. In step 206, payload boot algorithm 120 discovers hardware capability set 122, and in step 208, hardware capability set 122 is communicated to payload discovery manager 114 at central node 102.

In step 210, payload discovery manager 114 selects software set 116 based on hardware capability set 122. In an embodiment, payload discovery manager 114 can select software set 116 to optimize computer network 100. In another embodiment, payload discovery manager 114 can select software set 116 based on pre-configured or user-configured decision rules based on, for example, algorithms or look-up tables. In step 212, software set 116 is communicated to payload node 104 via backplane 119, wireless communication means, and the like. In step 214, payload node 104 is transitioned from running payload boot algorithm 120 to any of software set 116 while bypassing rebooting payload node 104 to software set 116. In an embodiment, software set 116 includes transition module 115 that operates to transition payload node 104 while bypassing rebooting, from for example, a BIOS or firmware.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A method of discovering and operating a payload node, comprising:
   coupling the payload node to a payload node slot in a computer network having a central node coupled to a payload node slot;
   executing by the payload node a payload boot algorithm located at the payload node;
   discovering by the payload boot algorithm a hardware capability set of the payload node;
   communicating the hardware capability set to a payload discovery manager at the central node;
   selecting by the payload discovery manager a software set based on the hardware capability set;
   communicating by the payload discovery manager the software set to the payload node; and
   transitioning operating the payload node from the payload boot algorithm to the software set while bypassing rebooting the payload node to the software set.

2. The method of claim 1, wherein the software set comprises a transition module and an operating system module, wherein transitioning comprises the transition module transitioning the payload node from the payload boot algorithm to the operating system module.

3. The method of claim 2, wherein transitioning, by the transition module, the payload node from the payload boot algorithm to the operating system module while bypassing rebooting the payload node to the operating system module.

4. The method of claim 2, wherein selecting, by the payload discovery manager, the transition module based on the hardware capability set and the software set selected.

5. The method of claim 2, wherein selecting, by the payload discovery manager, the transition module to transition the payload boot algorithm to the operating system module while bypassing rebooting the payload node to the operating system module.

6. The method of claim 1, wherein selecting comprises selecting the software set to optimize the computer network.

7. The method of claim 1, wherein the computer network is a backplane-based computer network.

8. The method of claim 1, further comprising:
   removing the payload node from the payload node slot;
   changing the hardware capability set to a second hardware capability set;
   coupling the payload node to the payload node slot;
   discovering by the payload boot algorithm the second hardware capability set;
   communicating the second hardware capability set to the payload discovery manager;
   selecting by the payload discovery manager a second software set based on the second hardware capability set and communicating the second software set to the payload node; and
   transitioning operating the payload node from the payload boot algorithm to the second software set bypassing rebooting the payload node to the second software set.

9. In a payload node, a method, comprising:
   executing by the payload node a payload boot algorithm located at the payload node upon coupling the payload node to a payload node slot in a computer network having a central node;
   discovering by the payload boot algorithm a hardware capability set of the payload node;
   communicating the hardware capability set to a payload discovery manager at the central node; and
   transitioning operating the payload node from the payload boot algorithm to a software set while bypassing rebooting the payload node to the software set upon the payload discovery manager selecting the software set based on the hardware capability set and communicating the software set to the payload node.

10. The payload node of claim 9, wherein the software set comprises a transition module and an operating system module, wherein transitioning comprises the transition module transitioning the payload node from the payload boot algorithm to the operating system module.

11. The payload node of claim 10, wherein transitioning, by the transition module, the payload node from the payload boot algorithm to the operating system module while bypassing rebooting the payload node to the operating system module.

12. A computer network, comprising:
   a central node;
   a payload discovery manager located at the central node, wherein the payload discovery manager is coupled to select a software set;
   a payload node slot coupled to the central node;
   a payload node coupled to interface with the payload node slot, wherein the payload node comprises a hardware capability set; and
   a payload boot algorithm located at the payload node and coupled to execute when the payload node is coupled to the payload node slot, wherein the payload boot algorithm discovers the hardware capability set and communicates the hardware capability set to the payload discovery manager, wherein the payload discovery manager selects the software set based on the hardware capability set and communicates the software set to the payload node, and wherein the payload node transitions from using the payload boot algorithm to using the software set while bypassing rebooting to the payload node to the software set.

13. The computer network of claim 12, wherein the software set comprises a transition module and an operating system module, and wherein the transition module transitions the payload node from the payload boot algorithm to the operating system module.

14. The computer network of claim 13, wherein the transition module transitions the payload node from the payload boot algorithm to the operating system module while bypassing rebooting the payload node to the operating system module.

15. The computer network of claim 13, wherein the payload discovery manager selects the transition module based on the hardware capability set and the software set selected.

16. The computer network of claim 13, wherein the payload discovery manager selects the transition module to transition the payload boot algorithm to the operating system module while bypassing rebooting the payload node to the operating system module.

17. The computer network of claim 12, wherein the payload discovery manager selects the software set to optimize the computer network.

18. The computer network of claim 12, wherein the computer network is a backplane-based computer network.

19. A computer-readable medium containing computer instructions for instructing a processor to perform a method of discovering and operating a payload node, the instructions comprising:
   instructions for the payload node executing a payload boot algorithm located at the payload node upon coupling the payload node to a payload node slot in a computer network having a central node coupled to the payload node slot;
   instructions for the payload boot algorithm discovering a hardware capability set of the payload node;
   instructions for communicating the hardware capability set to a payload discovery manager at the central node;
   instructions for the payload discovery manager selecting a software set based on the hardware capability set;
   instructions for the payload discovery manager communicating the software set to the payload node; and
   instructions for the payload node transitioning operating from the payload boot algorithm to the software set while bypassing rebooting the payload node to the software set.

20. The computer-readable medium of claim 19, wherein the software set comprises a transition module and an operating system module, wherein transitioning comprises the transition module transitioning the payload node from the payload boot algorithm to the operating system module.

21. The computer-readable medium of claim 20, wherein the transition module transitions the payload node from the payload boot algorithm to the operating system module while bypassing rebooting the payload node to the operating system module.

22. The computer-readable medium of claim 20, wherein the payload discovery manager selects the transition module based on the hardware capability set and the software set selected.

23. The computer-readable medium of claim 20, wherein the payload discovery manager selecting the transition module to transition the payload boot algorithm to the operating system module while bypassing rebooting the payload node to the operating system module.

24. The computer-readable medium of claim 19, wherein selecting comprises 20 selecting the software set to optimize the computer network.

25. The computer-readable medium of claim 19, wherein the computer network is a backplane-based computer network.

* * * * *